Oct. 22, 1963
D. H. THORBURN
3,107,680
RELAY VALVE
Filed June 6, 1961
3 Sheets-Sheet 1
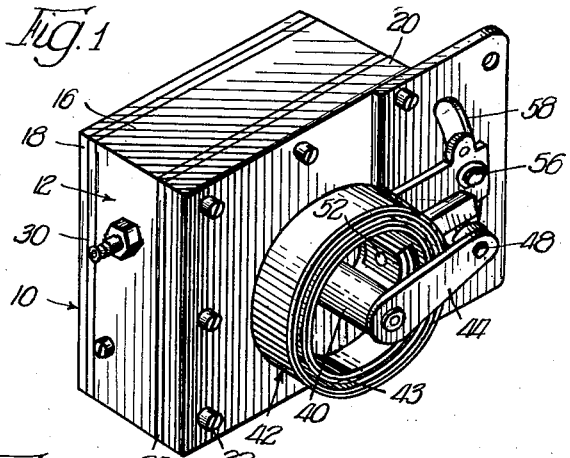
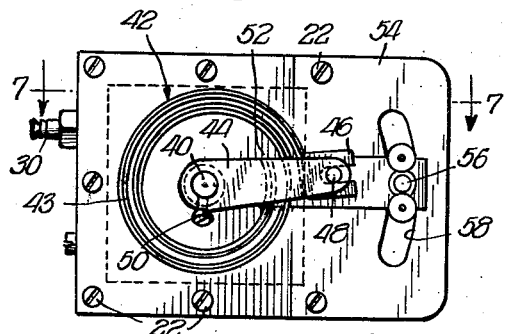
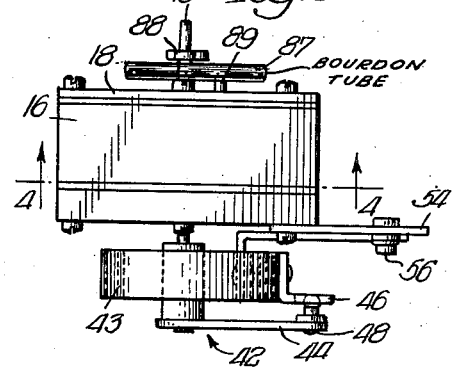
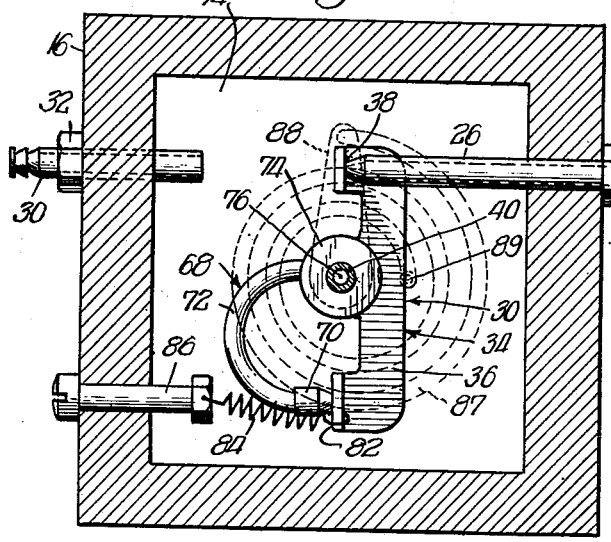
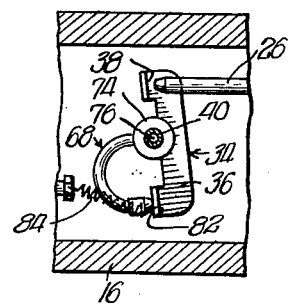
INVENTOR.
David H. Thorburn,
BY

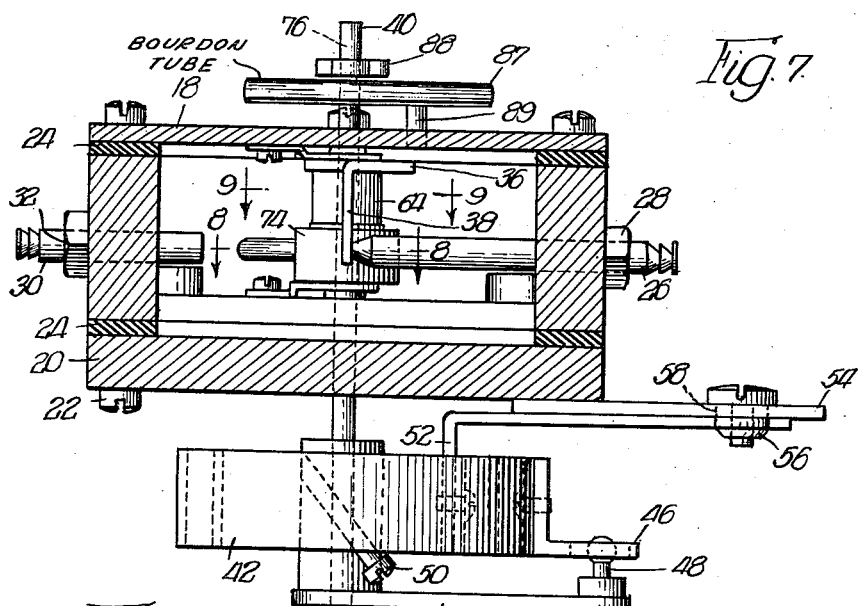
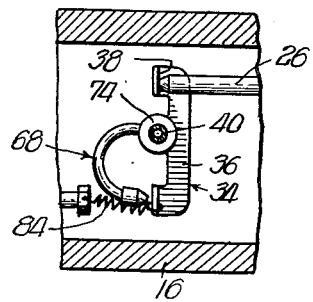
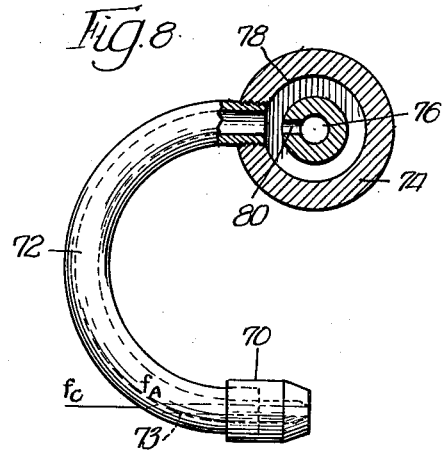
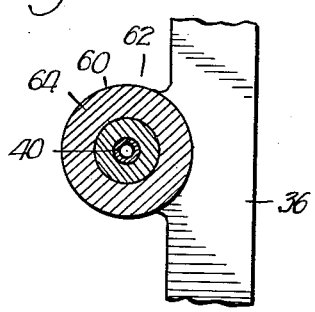

Oct. 22, 1963 D. H. THORBURN 3,107,680
RELAY VALVE
Filed June 6, 1961 3 Sheets-Sheet 3
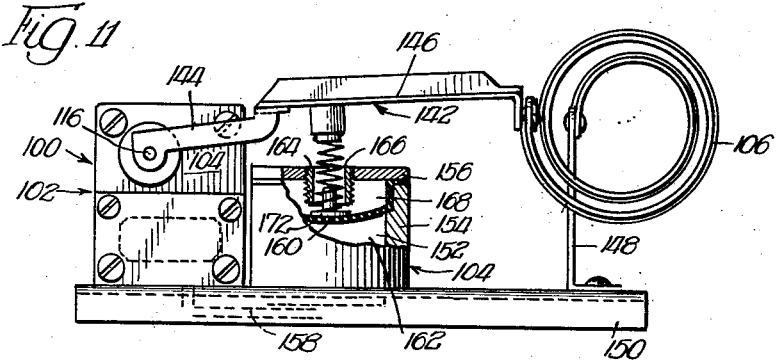
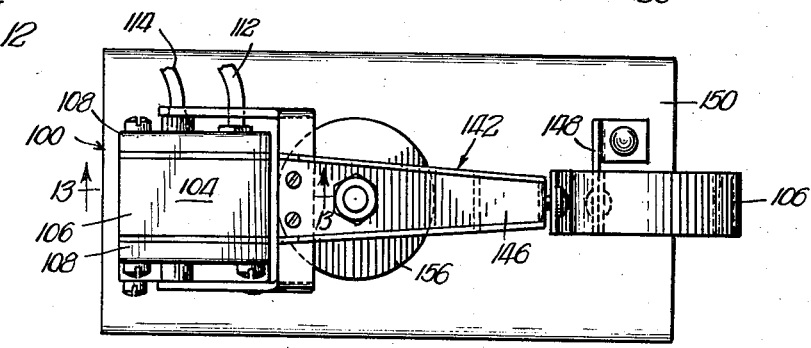
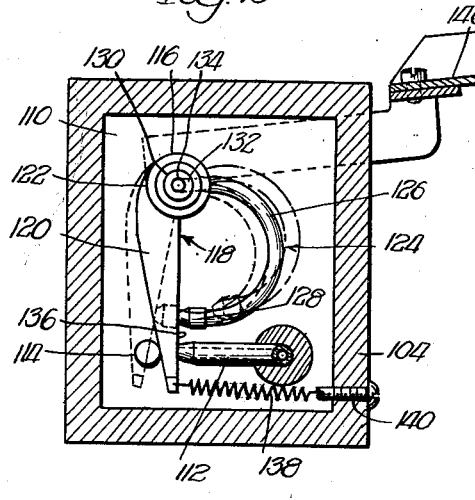
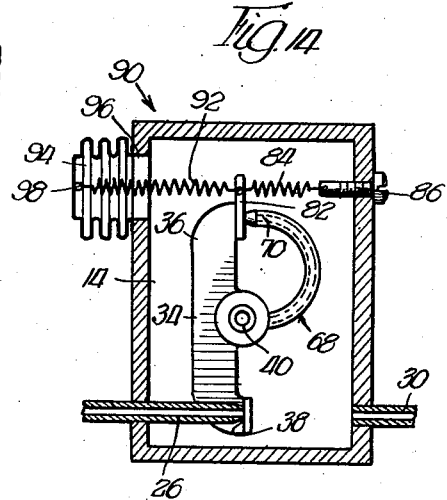
INVENTOR.
David H. Thorburn,
BY United States Patent Office 3,107,680
Patented Oct. 22, 1963

3,107,680
RELAY VALVE
David H. Thorburn, Oak Park, Ill., assignor to The Powers Regulator Company, Skokie, Ill., a corporation of Illinois
Filed June 6, 1961, Ser. No. 115,181
15 Claims. (Cl. 137—85)

This invention pertains to a relay device and in particular to a relay device especially adapted to generate a pneumatic signal upon actuation by condition sensing means.

The prior art is filled with many different designs of relays that are adapted to be utilized in pneumatic systems. These relays may be characterized as generating a pneumatic signal which is directly proportional to an input signal received in the relay from some source such as a condition sensing device.

One general type of relay which is found throughout the prior art embodies a double valve construction which utilizes a flexible diaphragm for supporting one of the valves and is adapted to sense the input signal. The double valve construction does perform satisfactorily in many instances, but does have certain characteristics which impose limitations on its use. The double valve construction is characterized as including a built-in feedback, a relatively high volume capacity and a confined air system in which there is only intermittent bleed to atmosphere. The inherent disadvantage of the double valve construction is that it requires relatively larger forces to accurately actuate the diaphragm construction so that it is impossible to utilize it in conjunction with sensing devices which generate a signal of relatively small magnitude. A corollary to the force disadvantage is that the size must be relatively large, since there is a minimum practical diaphragm area. The latter limitation is further complicated by the fact that a substantial portion of the diaphragm is in engagement with the valve supported thereby.

A second type of relay which has also enjoyed widespread usage is the flapper nozzle in which a pivoted lever is arranged in cooperation with a bleed nozzle. The bleed nozzle is connected to a suitable source of air pressure and by moving the lever in and out of engagement with the end of the nozzle the pressure within the system is varied. The control of the lever may be effected by means of a condition sensing device such as a bimetallic element. The inherent advantage of the flapper nozzle is that the lever may be actuated by condition sensing means which generate signals of small magnitude such as the aforementioned bimetallic element. The disadvantages are its small volume, lack of built-in feedback, and constant air bleed.

The subject invention provides most of the advantages of the two relays discussed hereinbefore and at the same time eliminates substantially most of their disadvantages. For example, the invention is characterized as having high volume capacity, a confined air system in which there is no bleed to atmosphere and is adapted to be actuated by small signal forces which permit the utilization of condition sensing means such as bimetallic elements. While the invention does not inherently contain a built-in feedback it is so constructed and designed that it may readily be combined with a feedback element for achieving proportional response.

The subject invention may be generally characterized as a relay composed of a chamber which is connected by means of an inlet nozzle to a source of air pressure and by an outlet nozzle to the device to be controlled by the relay. A movable valve member is mounted within the chamber and is resiliently biased into engagement with the inlet nozzle so as to prevent the flow from the source of air pressure into the chamber. The relay is further provided with an exhaust conduit having an opening in the chamber for permitting flow therefrom to the ambient atmosphere. The opening of the nozzle is normally biased into engagement with the movable valve member so as to prevent the exhaust from the chamber. The arrangement of the exhaust and the movable valve member is such that the two are in seated engagement when the movable valve member is moved in and out of engagement with the inlet nozzle. When the movable valve member is in its seated engagement with the inlet nozzle, then the exhaust may be unseated from the valve member so as to permit exhaust from the chamber to the atmosphere.

In a more specific form, the invention comprises an inlet nozzle and an outlet nozzle mounted within a chamber and an exhaust nozzle as previously described. The movable valve member is a rotatably mounted lever having a valving surface on at least one or both ends thereof. The valving surface is adapted to be rotated in or out of engagement with the exhaust and inlet nozzles so as to control the flow to and from the chamber. The exhaust nozzle and, in turn, valve member are connected to a condition sensing means such as a bimetallic element which is adapted to rotate the former with respect to the inlet nozzle and the latter with respect to the valving surface.

As a result of this arrangement, the limitations of the prior art devices are substantially obviated. In particular, it is possible to substantially increase the magnitude of the ratio between the input and output pressures of the relay over the ratios of the diaphragm type relays. Thus, it is possible to utilize condition sensing devices which generate signals of a relatively small magnitude, even though the specific application requires a relatively high pressure output signal. Moreover, the constant bleed and consequent waste are eliminated.

A foremost feature and object of the invention resides in the provision of a relay in which the ratios between the input and output signals may be relatively large.

Another feature and object of the invention resides in the provision of a relay in which there is only intermittent bleed to atmosphere.

Another feature and object of the invention resides in the provision of a relay which is especially adapted to be utilized in conjunction with condition sensing devices which generate a relatively small signal, such as bimetallic elements. At the same time the relay, when utilized in conjunction with such devices, is not limited to output signals that are corespondingly small in magnitude.

Another feature and object of the invention is the provision of a relay in which errors normally induced by variations in pressure within relays of the conventional type may be substantially eliminated by pressure compensating devices.

Another feature and object of the invention is the provision of a unique and novel relay which is of a simple and inexpensive construction, and which provides a precise and accurate result.

These and other features and objects of the invention will be apparent upon reading of the specification with reference to the following drawings.

In the drawings

FIGURES 1, 2 and 3 are perspective front and plan views in elevation of one form of the relay embodying the invention;

FIGURE 4 is a sectional view taken along the lines 4—4 in FIGURE 3;

FIGURES 5 and 6 are fragmentary sectional views similar to FIGURE 4 showing the various positions of the components of the invention;

FIGURE 7 is a sectional view taken along the lines 7—7 in FIGURE 2;

FIGURE 8 is a fragmentary sectional view taken along the lines 8—8 in FIGURE 7;

FIGURE 9 is a fragmentary sectional view taken along the lines 9—9 in FIGURE 8;

FIGURE 10 is a diagrammatic illustration of the forces on the movable valve member;

FIGURE 11 is a front view in elevation of a modification of the invention;

FIGURE 12 is a plan view in elevation of a modification shown in FIGURE 11;

FIGURE 13 is a sectional view taken along lines 13—13 in FIGURE 12;

FIGURE 14 is a sectional view of a still further modification of the invention.

Referring now to FIGURES 1 to 9, there is shown one form of the relay embodying the invention, generally denoted by the numeral 10. It will be apparent upon reading of the specification that the various components of the relay 10 may be constructed of any suitable materials which have the desired properties for fulfilling the purpose for which they are intended. It will also be apparent that the particular shape and appearance of the various components utilized in the construction of the invention may be varied from that shown in the drawings and that such drawings are merely exemplary of the forms that they may take. Moreover, the relay may be used in various types of pneumatic systems other than those which are specifically described in the specification.

For purposes of convenience one form of the relay will be described for use in conjunction with a pneumatic control system. Specfically, the system will be composed of a condition sensing means such as a bimetallic element which is adapted to generate a signal in accordance with the changes in the sensed condition. The signals are in turn adapted to cause output signals of pneumatic pressure of corresponding magnitude which are communicated to a control device, such as a valve (not shown), for controlling the heating or cooling media. The relay may be utilized with other types of condition sensing means, such as volume type temperature sensing devices, which would include Bourdon tubes, bellows, diaphragms and the like. In addition to temperature control systems, the relay may be used in conjunction with humidistats, transducers, and in fact with any type of system in which a pneumatic signal is utilized for actuating a device for regulating a controlled media.

Referring now to FIGURE 1, there is shown a perspective view of the first form of the invention. The relay 10 includes an outer casing 12 which defines a chamber 14 as best shown in FIGURE 4. The casing 12 includes a substantially rectangular tube 16 which is closed at both ends by plates 18 and 20. The plates 18 and 20 are secured to the tube 16 by some suitable means such as the screws 22. Intermediate the plates 18 and 20 and the tube 16 are the gasket members 24 for preventing leakage from the chamber 14 to the ambient atmosphere.

An inlet nozzle 26 extends through one side of the tube 16, as can be seen in FIGURE 4. The inlet nozzle 26 opens into the chamber 14 at one end and is adapted to be connected at the other end to a suitable source of air pressure (not shown). The nozzle 26 is secured in place by means of the lock-nut 28 which is received by an appropriately threaded portion. As will be seen later on, controlled amounts of air may be admitted through the nozzle 26 from the connected source for operating a control valve or the like.

An outlet nozzle 30 extends through a second wall of the chamber 16 and is secured in place by means of a lock-nut 32. One end of the outlet nozzle 30 opens within the chamber 14, with the other end being adapted to communicate with a device for regulating a controlled media.

In FIGURE 4 the inlet and outlet nozzles 26 and 30 are shown in substantially opposing relationship. It is to be kept in mind that this is merely by way of example and that they may be arranged in any manner desired, as long as there is no interference with the movable valve member for controlling the flow from the inlet nozzle, as will be described hereinafter.

A movable valve assembly generally denoted by the numeral 30 is mounted within the chamber 14, as can best be seen in FIGURES 4, 5 and 6. The movable valve assembly 34 includes the rocker arm or lever 36, which is rotatably mounted intermediate its ends. In this modification, the lever 36 is provided with a valving surface 38, which is aligned with the end of the nozzle 26 and is substantially transverse to the axis thereof. The valving surface 38 is adapted to be rotated in and out of engagement with the end of the nozzle 28 so as to control the flow of air therefrom into the chamber 14.

The lever 36 is secured to a rotatably mounted shaft 40 which extends through the plates 18 and 20. The rotatably mounted shaft 40 is connected at one end to a bimetallic element 42, which is adapted to rotate the shaft in accordance with variations of temperature. The bimetallic element 42 comprises a bimetal strip 43 formed into a plurality of convolutions in which the outer end is connected to a crank arm 44 by means of a clevis 46 which receives a pin 48 secured at one end to the arm 44. The other end of the arm 44 is secured by means of a set screw 50 to the end of the shaft 40 projecting through the plate 20. The inner end of the bimetallic element 42 is fixed in a predetermined position by means of a lug 52 mounted on the flange 54 which projects from the plate 20 and is secured thereto by means of the bolts 22. The lug 52 is secured to the flange 54 by a cap screw 56 which is received within an elongate slot 58 in the flange 54. The screw 56 may be positioned at any point within the slot 58 so as to vary the position of the inner end of the bimetallic element 42 correspondingly. In this manner it is possible to vary the equilibrium temperature of the relay.

The bimetallic element 42 may be constructed in a conventional manner of any suitable materials which will provide the desired results. The number of convolutions or the length of the element will vary in accordance with the amount of movement desired for each increment of temperature change and the materials used.

The lever 36 is mounted on the shaft 40 for rotation relative thereto as shown in FIGURE 9. In the preferred embodiment the lever 36 includes a hub 64 having an aperture 66 for receiving the shaft 40. The hub 64 may be provided with a bushing of some material having a low coefficient of friction in order to facilitate rotation relative to the shaft 40. The lever 36 is driven by an exhaust assembly generally denoted by the numeral 68. The exhaust assembly comprises an exhaust nozzle 70 which is mounted on one end of the conduit 72. The other end of the conduit 72 is secured to a hub 74 mounted on the rotatable shaft 40 for rotation therewith. The rotatable shaft 40 is provided with a bore 76 extending from a point coincident with the exhaust assembly 68 to the end extending through the plate 18, as can be seen in FIGURE 7. The hub 74 is provided with the annulus 78 for communication with the open end of the conduit 72 and the bore 76 by means of the radially extending passage 80 in the shaft 40. As a result of the construction shown in FIGURE 8, the exhaust assembly 68 permits the egress of air from the chamber to the ambient atmosphere when the nozzle is open in the chamber 14.

Referring back to FIGURE 4 it can be seen that the nozzle 70 is adapted to engage a valving surface 82 in the lower end of the lever 36. The valving surface 82 is similar in construction to the one at the other end of the lever 36 and is positioned on a flange at right angles to the main part of the lever. As can be seen in FIGURE 7 the inlet nozzle 26 and the exhaust nozzle 70 are positioned in substantially the same vertical plane but in opposing relationship. This construction is by way of example and it will be seen later on that other arrangements of the nozzles 26 and 70 may be used in the construction of the invention.

A spring 84 is secured at one end to the lower end of the lever 82 and at the other end to the screw member 86, as can be seen in FIGURE 4. The spring 84 biases the lever 86 so that the valving surface 38 is normally in engagement with the nozzle 26. In a preferred embodiment of the invention the load on the spring when the valve is in the position shown in FIGURE 4 is merely sufficient to maintain the surface 38 in engagement with the nozzle 26 against the force of the pressure at the nozzle when the pressure in the chamber 14 is zero absolute (atmospheric).

When the shaft 40 is rotated the exhaust assembly 68 is adapted to be rotated therewith in the same direction. Thus, if the rotation of the shaft is in the counterclockwise direction, the nozzle 70 will abut the valving surface 82 and cause the lever 36 to be rotated in the same direction. When this happens the valving surface 38 separates from the nozzle 26 so as to permit flow into the chamber 14, as can be seen in FIGURE 5. At the same time the conduit 72 and the nozzle 70 are rotated with the shaft 40 and lever 36 so that the nozzle 70 remains in contact with the valving surface 82. Thus the exhaust passages are closed with respect to the chamber 14.

When the shaft 40 is rotated in the clockwise direction the lever 36 is then permitted to return to its seated position on the nozzle 26 to interrupt the flow of air into the chamber 14. Continued rotation of the shaft 40 in the clockwise direction will cause the exhaust conduit to rotate with respect to the lever 36 so that the nozzle 70 separates from the surface 82 as can be seen in FIGURE 6. At this point the chamber 14 is then in communication with the ambient atmosphere through the passages defined by the exhaust assembly 68.

Referring now to FIGURE 10 there is shown a diagrammatic illustration of the various forces acting on the lever 36 during the operation of the relay 10. When the system is at equilibrium with respect to the condition sensed and the pressure within the chamber is equal to zero the only forces on the lever are $f_p$ and $f_s$. These forces are created by the pressure within the nozzle 26 and the spring 84 respectively. As was mentioned previously, when the pressure within the chamber is equal to zero, $f_s$ is only slightly greater than $f_p$ so that the total moment on the lever 36 is substantially equal to zero. If the bimetallic element 42 should sense an increase in temperature it will then exert a force designated $f_m$ on the lever through the shaft 40 and nozzle assembly 68. Since $f_m$ is additive to $f_p$, the lever 36 will be rotated in a counterclockwise direction so that the surface 38 is unseated from the nozzle 26 thus permitting flow into the chamber 14. As soon as there is a drop in temperature which is sensed by the bimetal strip 43 it will tend to rotate the lever 36 in the opposite direction until it is again seated on the nozzle 26.

Once the pressure in the chamber 14 has assumed some positive value there is a third force exerted upon the lever 36. This force is designated $f_{pr}$ and is acting in the opposite direction to $f_p$ and in the same direction as $f_s$. The force $f_{pr}$ is equal to the pressure within the chamber 14 times the area at the end of the nozzle 26 seated on the valving surface 38. Since $f_{pr}$ and $f_s$ are greater than $f_p$ then the total force tending to bias the lever 36 into engagement with the nozzle 26 will increase as the pressure within the chamber 14 increases. Depending upon the design of the particular relay this may tend to induce some error into the relay as the pressure increases within the chamber 14. However, where the area of the nozzle is relatively small and the supply pressure is relatively large the error may be sufficiently small compared to the supply pressure so as to be negligible. However, in these systems where even the small error is intolerable it is possible to compensate for $f_{pr}$ as will be described later on in the specification.

It will be noted as can be seen in FIGURE 3 that a fourth force may be imposed on the lever depending upon the construction of the conduit 72 of the exhaust assembly 68. Since the pressure within the chamber 14 is always equal to atmospheric or greater, it will be at least equal to or greater than the pressure within the exhaust conduit 72. Referring to FIGURE 8 it can be seen that the respective forces resulting from the pressure within the conduit 72 will generally cancel each other out due to the symmetrical construction of the conduit. However, an exception is the force acting against the area 73 projected on the conduit side wall by the opening at the end of the nozzle 60. In that instance an opposing force will be generated by the pressure in chamber 14 against corresponding area on the outside surface of the conduit 70. When the pressure within the chamber 14 is greater than atmospheric, then force $f_c$ will be greater than the force $f_a$ thus tending to rotate the nozzle in a clockwise direction. When the nozzle 70 is in abutment with the lever 36 the force imposed upon the conduit 72 will be transmitted to the lever 36. As can be seen from the diagram in FIGURE 10 the resultant $f_d$ of force $f_c$ minus the force $f_a$ will act in the direction opposite to the spring force $f_s$ and the force $f_{pr}$. Thus the resultant $f_d$ will tend to offset the force $f_{pr}$ as the pressure within the chamber 14 increases, and it is conceivable that the relay could be constructed so that the resultant substantially counterbalances the force $f_{pr}$.

As was mentioned previously, when the bimetallic element 42 senses a change in temperature from the equilibrium it will cause the lever 36 to be moved in a corresponding direction to compensate for the change. When the temperature has been returned to the equilibrium point the bimetallic element will then move the lever back into its equilibrium position. This type of an arrangement provides an on-off construction which may not be entirely satisfactory for certain applications. Specifically, in many instances it will be desirable to have proportional response in which the bimetallic element as well as the various components of the relay are subjected to a positive feedback force created by the variations in pressure within the chamber 14. The feedback may be accomplished by means of a pressure sensitive device such as a Bourdon tube 87 mounted on the plate 18 and attached at one end through a crank arm 88 to the shaft 40. The other end of the Bourdon tube 87 will communicate by means of the duct 89 with the chamber 14 so as to receive the pressure therein. The Bourdon tube will be adapted to drive the shaft 14 in directions opposite to that of the bimetallic element 42 as the result of expansions and contractions caused by variations of pressure within the chamber 14. Thus, assuming that the bimetallic element 42 causes the nozzle 26 to be opened so as to result in an increase in pressure, the Bourdon tube will, in turn, be expanded by the increase so as to tend to rotate the shaft 40 in the opposite direction. When the pressure reaches the predetermined level corresponding to the temperature correction desired, the lever 36 will be returned to its seated position, thus establishing an equilibrium condition within the relay 10. In this manner it is not necessary for the results of the change at the control media to be sensed by the bimetallic element before corresponding adjustments are made with respect to the position of the lever 36.

It can now be seen that the subject invention provides a relay for translating a received signal into a pressure signal of a corresponding magnitude. Since the forces on the movable valve member are substantially balanced, the ratios between the received and output signals may be of a relatively high magnitude and still maintain the desired accuracy of the relay.

Referring now to FIGURE 14 there is shown a modification of the invention in which the error induced by build-up of pressure within the chamber 14 may be completely eliminated. The parts of the modification 90 that correspond to the previously described embodiment are designated by like numbers. In essence, the modification 90 comprises the chamber 14 having the inlet nozzle 26, outlet nozzle 30, a movable valve assembly 34 and an exhaust assembly 68. The movable valve assembly 34 comprises a lever 36 mounted on a shaft 40 for rotation therewith and comprising the valving surfaces 38 and 82 which are adapted to control the flow through the nozzles 26 and 70, respectively. The lever 36 is biased in its seated position on the nozzle 26 by means of the coil spring 84 attached to the adjustable stem 86.

The error compensation device included in the modification 90 comprises the coil spring 92 which is secured at one end to the lever 36 and at the other end to the bellows 94. As can be seen from the drawing the spring 92 is adapted to act in opposing relationship to the spring 84. Thus, a part of a force exerted by the spring 84 is offset by the spring 92. Since it is desired that the lever 36 normally be biased into seated engagement with the nozzle 26 the spring 84 should exert a greater force on the lever than the spring 92.

As will be explained hereinafter the force exerted by the spring 92 varies in accordance with the pressure in the chamber 14. The bellows 94 is attached to the casing defining the chamber 14 and is substantially aligned with an aperture 96. The bellows 94 is of a conventional type composing a plurality of convolutions having one end sealed so as to form an airtight compartment communicating with the chamber 14. The spring 92 is attached to the sealed end of the bellows 94 by means of a lug 98 attached thereto. Thus, it can be seen that as the pressure within the chamber 14 increases the bellows will be forced to expand a corresponding amount in the usual manner. The expansion of the bellows 94 will cause the expansion of the spring 92 so as to exert a greater force on the end of the lever 36. It is contemplated that the force exerted by the spring 92 on the lever 36 will be substantially equal and opposite to that force exerted by the pressure within the chamber 14. Thus, as the force $f_p$ increases in direct proportion to the pressure within the chamber 14, the spring pressure exerted by spring 92 will be increased in the same direct proportion. Since the magnitude of $f_p$ is determined by the pressures within the chamber 14 as well as the size of the aperture in the nozzle 26 it will be necessary to use bellows 94 and spring 92 of a proportional size and rate respectively. Thus, as can be seen in FIGURE 10 another force is added to those acting on the lever 36. Specifically, the force $f_e$ acts on the lever 36 so as to create a moment corresponding in magnitude but opposite in direction to that imposed by the force $f_m$ which is the result of the pressure within the chamber 14. It is to be noted that the force $f_e$ acts in the same direction as the resultant $f_d$ so that the former may be somewhat smaller than the force $f_{pr}$. In any event the total moment created by the forces shown in schematic diagram should equal substantially zero when the system is at equilibrium regardless of the pressure within the chamber 14.

Thus, it can be seen that the modification shown in FIGURE 14 provides a simple and effective means for compensating for any error induced by the build-up of pressure within the chamber 14. It will be apparent that other types of pressure sensitive devices may be used in lieu of bellows and spring arrangement as shown in the modification. Such pressure sensitive devices could include diaphragms, Bourdon tubes and the like.

Referring now to FIGURES 11, 12 and 13 there is shown another modification of the relay embodying the invention, generally denoted by the numeral 100. This modification includes the relay 102 to which is attached a feedback mechanism 104 and a temperature sensitive element 106, all of which will be described in detail hereinafter.

The relay comprises a casing 104 composed of the rectangular portion 106 and the end plates 108 which cooperate to define a chamber 110. Referring now to FIGURES 12 and 13 the relay 102 is provided with the inlet nozzle 112 extending through one of the plates 108 and then including a right angle bend so that the nozzle terminates in a direction substantially parallel with the end plates. The nozzle 112 is adapted to be connected to a suitable source of pressure as described previously.

The relay 102 further includes an outlet nozzle 114 which extends through one of the plates 108 as can be seen from the drawings. The outlet nozzle 114 is adapted to communicate with a control device such as a pneumatically operated valve.

A rotatably mounted shaft 116 is journaled in and extends between the end plates 108. A valve assembly 118 is mounted on the shaft 116 for rotation therewith. The valve assembly 118 includes a lever 120 which is secured at one end to the shaft 116 by means of the hub 122. The hub 122 is rotatably mounted on the shaft 116 in the manner shown in FIGURE 9.

The valve assembly 118 further includes an exhaust assembly 124 composed of the conduit 126 and the nozzle 128. The conduit is secured to the shaft 116 by means of a hub 130 for rotation therewith. The hub is provided with an annulus 132 which communicates with the passage and the conduit 126 and with the bore 134 which extends through the shaft 116.

The lever 120 is provided with a valving surface 136 which is adapted to cooperate with the ends of the nozzles 112 and 128 to control the flow of the air therethrough. A spring 138 is secured to the end of the lever 136 for biasing it toward engagement with the end of the nozzle 112. The spring 138 is attached at its other end to the cap screw 140 which extends through the casing 104.

It can now be seen that when the shaft 116 is rotated in a clockwise direction the exhaust assembly 124 will likewise be rotated in that direction and in turn will cause the lever 120 to rotate away from the end of the nozzle 112. In this manner air is permitted to flow from the nozzle 112 into the chamber 110 so as to increase the pressure therein. Since the hub 130 and the conduit 126 are non-rotatably mounted on the shaft 116 the nozzle 128 will remain in engagement with the valving surface 136 so as to prevent the exhaust from the chamber 110 to the ambient atmosphere. When the shaft 116 is rotated in a counterclockwise direction the lever 120 will be returned to its seated position on the nozzle 112 with the nozzle 128 remaining in engagement with the valving surface 136. If the counterclockwise rotation of the shaft 116 should be continued the lever 120 will remain in its seated position and the nozzle 128 will be caused to unseat therefrom so as to exhaust to the atmosphere. The nozzle 128 may be returned to its seated position by subsequent clockwise rotation of the shaft 116.

It will be noted that the primary difference between the embodiment as shown in FIGURE 13 and that shown in FIGURES 1 through 9 is the relationship of the inlet and exhaust nozzle with respect to the lever. Specifically, in this embodiment the nozzles are adapted to cooperate with the same end of the lever with the other end being attached to the rotatable shaft. The principle of operation of the construction as shown in FIGURE 13 is substantially the same as the previous embodiment particularly with respect to the forces shown in FIGURE 10 so that a repetition of the balance of forces will not be made at this time.

The shaft 116 is driven by means of the lever assembly 142 which is connected to the temperature sensing element 106. The lever assembly 142 is composed of a yoke 144 which is connected to the ends of the shaft 116 projecting through the plates 108. The closed end of the yoke 144 is attached to one end of the link 146 which is secured at its other end to the bimetallic element 106. The expansion and contraction of the bimetallic element 106 is adapted to oscillate the lever assembly 142 so as to rotate the shaft 116 and thus operate the relay 102 as previously described.

The bimetallic element 106 is composed of a plurality of convolutions and is secured at its outer end to the link 146. The inner end of the bimetallic element is fixed to the post 148 which projects upwardly from the base 150 on which the entire assembly is mounted. Since the inner end of the bimetallic element 106 is fixed only the outer end can move, with such movement causing the oscillations of the lever 142.

The relay 102 is connected to the feedback device generally denoted by the numeral 104. The feedback device includes a substantially cylindrical chamber 152 which is defined by the casing 154, the end plate 156, and the base 150.

The chamber 152 is divided into upper and lower compartments 168 and 162 by means of diaphragm 160 which is secured at its periphery between the plate 156 and the casing 154. The compartment 162 communicates with the chamber 110 and the relay 102 by means of the duct 158 as shown in FIGURE 11. In this manner the pressure within the chamber 110 is sensed within the compartment 162. As will be seen later on the compartment 168 is at atmospheric pressure. The diaphragm 160 is adapted to be flexed in accordance with the pressures received in the lower compartment 162 from the chamber 110 of the relay 102. Thus an increase in pressure in the compartment 162 will cause the diaphragm to be flexed upwardly in the conventional manner.

The plate 156 is provided with an aperture 164 and a bushing 166 which connects the upper compartment 168 to the atmosphere. A coil spring 170 having its upper end secured to the lever assembly 142 is received and projects downwardly through the bushing 166. The lower end of the coil spring 170 is secured to a plunger 172 which rests on the diaphragm 160. When the lever assembly 142 is oscillated the coil spring and plunger impose corresponding forces on the diaphragm 160. If the lever assembly is moved upwardly the force on the diaphragm will be reduced and conversely if the assembly is moved downwardly the force will be increased. The force imposed by the plunger and spring will be in opposition to the force generated by the pressure within the compartment 162.

Thus, if the lever assembly 142 is moved downwardly, the lever 120 is rotated out of engagement with the inlet nozzle 112. This permits flow of air into the casing 110 so as to increase the pressure therein. The increase in pressure in the chamber 110 is reflected within the lower compartment 162 tending to force the diaphragm 160 upwardly. The force against the diaphragm 160 is transmitted to the lever assembly 142 through the plunger 172 and spring 170 so as to force the lever assembly upwardly. Thus as soon as the pressure within the casing 110 has reached some predetermined amount the valve assembly is then returned to its equilibrium position so that the nozzle 112 is seated against the valving surface 136.

On the other hand if the lever assembly 142 is caused to move upwardly by the bimetallic element 106 the nozzle 128 is unseated from the valving surface 136. The pressure within the casing 110 is then decreased with the same being communicated to the compartment 162. The decrease in pressure in the compartment 162 permits the diaphragm 160 to flex downwardly so that the spring 170 and plunger 172 are likewise permitted to move downwardly a corresponding amount. The lever in turn follows the spring 170 toward its equilibrium position. As soon as the pressure within the casing 110 has been reduced to the desired amount the lever assembly 142 will be returned to its equilibrium position so that the nozzle 128 is seated against the valving surface 136.

As was mentioned previously, other types of signal generating devices may be substituted for the bimetallic element described by way of example throughout the specification. For example, in the modification shown in FIGURES 11 and 12 a solenoid could be substituted for the bimetallic element 106. In that event the coil would be mounted on the base 150 and connected to some device for generating an electrical signal in accordance with the sensed condition. For example, the coil could be connected to a thermistor which is an electrical resistance element having a resistance variable in accordance with the temperature. Thus, as the temperature varies the amount of current directed to the coil would fluctuate so as to cause corresponding variations in the field generated by the coil. In this manner a slug of magnetic material attached to the end of the link 146 would be caused to move downwardly toward the coil an amount depending upon the strength of the field so as to oscillate the lever assembly 142. The oscillation of the lever assembly 142 would in turn cause the relay to be operated in the manner previously described. Other types of actuating devices such as humidistats, bourdon tubes and the like, obviously may be used in the practice of the invention as stated previously.

Although certain specific embodiments and terminology have been described and used throughout the specification, it is to be understood that this is merely by way of example and in no manner to be considered as a limitation. It is apparent that certain modifications may be made within the scope of the claims without departing from the spirit of the invention.

I claim:

1. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft having a lever mounted thereon, said lever having at least one valving surface thereon rotatable in and out of engagement with said inlet port, an exhaust conduit having an opening in said chamber for exhausting to atmosphere, means for biasing said lever so that said valving surface normally engages said inlet port and said opening of said exhaust conduit to prevent flow therethrough, said exhaust conduit being connected to said rotatable shaft for rotation therewith, and being in engagement with said valving surface to rotate said lever out of engagement with said inlet port, said exhaust conduit being rotatable out of engagement with said valving surface when the latter is in engagement with said inlet port, and condition sensing means connected to said rotatable shaft for rotating said exhaust conduit.

2. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft having a relatively rotatable lever mounted thereon, said lever having at least one valving surface thereon movable in and out of engagement with said inlet port through the rotation of said lever, said rotatable shaft having a bore extending from said chamber to a point external thereof open to atmosphere, an exhaust conduit comprising a nozzle mounted within said chamber and communicating with said bore for exhausting to atmosphere, means for biasing said lever so that said valving surface normally engages said inlet port and said nozzle to prevent flow therethrough, said nozzle being drivingly connected to said rotatable shaft for rotation therewith, and being in engagement with said valving surface to rotate said lever out of engagement with said inlet port, said nozzle being movable out of engagement with said valving surface when the latter is in engagement with said inlet port, and condition sensing means connected to said rotatable shaft for rotating said nozzle.

3. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, a lever mounted adjacent one of its ends on said rotatable shaft for rotation relative thereto, a valving surface on said lever adjacent the other of its ends, said valving surface being movable in and out of seating engagement with said inlet port and said nozzle by the rotation of said lever, means for biasing said lever so that said valving surface normally engages said inlet port and said nozzle to prevent flow therethrough, said nozzle being drivingly connected to said rotatable shaft for rotation therewith, and engaging said valving surface to rotate said lever out of engagement with said inlet port, said nozzle being movable out of engagement with said valving surface when the latter is in engagement with said inlet port, and condition sensing means connected to said rotatable shaft for rotating said nozzle.

4. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft having a relatively rotatable lever mounted thereon, said lever having a valving surface means thereon rotatable in and out of seating engagement with said inlet port, said rotatable shaft having a bore extending from said chamber to a point external thereof open to atmosphere, an exhaust conduit comprising a nozzle fixedly mounted on said shaft within said chamber and communicating with said bore for exhausting to atmosphere, means for biasing said lever and said valving surface means thereon into engagement with said inlet port and said nozzle to prevent flow therethrough, said nozzle being connected to said rotatable shaft for rotation therewith, and being in engagement with said valving surface means for rotating the latter in and out of engagement with said inlet port, said nozzle being movable out of engagement with said valving surface means when the latter is in engagement with said inlet port, and condition sensing means connected to said rotatable shaft for rotating said nozzle and in turn said lever with respect to said inlet port and for moving said nozzle with respect to said lever.

5. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, a relatively rotatable lever mounted intermediate its ends on said rotatable shaft, said lever having a first valving surface adjacent one of its ends and a second valving surface adjacent the other of its ends, said first valving surface being movable in and out of engagement with said inlet port by the rotation of said lever, means for biasing said lever so that said first and second valving surfaces normally engage said inlet port and said nozzle, respectively, to prevent flow therethrough, said nozzle being drivingly connected to said rotatable shaft for rotation therewith and engaging said second valving surface for rotating said lever out of engagement with said inlet port, said nozzle being movable out of engagement with said second valving surface when the latter is in engagement with said inlet port, and condition sensing means connected to said rotatable shaft for driving said nozzle.

6. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, said nozzle and said inlet port facing in substantially opposite directions, a lever rotatably mounted intermediate its ends on said rotatable shaft therewith, a first valving surface adjacent one of the ends of said lever and a second valving surface adjacent the other end of said lever, said first and second valving surfaces being transverse and respectively aligned with said inlet port and said nozzle, said first valving surface being movable in and out of engagement with said inlet port by the rotation of said lever to selectively control the flow therethrough, means for biasing said lever into engagement with said inlet port and said nozzle to normally prevent flow therethrough, said nozzle being drivingly connected to said rotatable shaft for rotation therewith and engaging said second valving surface for rotating said lever out of engagement with said inlet port, said nozzle being movable out of engagement with said valving surface when the latter is in engagement with said inlet port, and condition sensing means connected to said rotatable shaft for driving said nozzle and in turn driving said lever with respect to said inlet port and for rotating said nozzle with respect to said lever.

7. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, said nozzle and said inlet port having substantially parallel axes and facing in substantially opposite directions, a lever rotatably mounted intermediate its ends on said rotatable shaft and being rotatable in a plane substantially parallel with said axes, a first valving surface adjacent one of the ends of said lever and a second valving surface adjacent the other end of said lever, said first and second valving surfaces being transverse to and respectively aligned with said inlet port and said nozzle and being movable in and out of engagement with said inlet port and said nozzle by the rotation of said lever to selectively control the flow therethrough, means for biasing said lever into engagement with said inlet port to normally prevent flow therethrough, said means for biasing imposing a moment on said lever substantially equal and opposite to that exerted by the pressure in said inlet port when the pressure within said chamber is zero, said nozzle being drivingly connected to said rotatable shaft for rotation therewith and engaging said second valving surface for rotating said lever in and out of engagement with said inlet port, said nozzle being movable out of engagement with said second valving surface when said first valving surface is in engagement with said inlet port, and condition sensing means connected to said rotatable shaft for rotating said nozzle and in turn said lever with respect to said inlet port and for rotating said nozzle with respect to said lever.

8. A relay device for generating a pressure proportional to a sensed condition comprising a substantially enclosed chamber having an inlet port adapted to be connected into a source of pressure, and an outlet port adapted to be connected to means for controlling said sensitive condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, said nozzle and said inlet port having substantially parallel axes and facing in substantially opposite directions, a lever rotatably mounted intermediate its ends on said rotatable shaft for rotation in a plane substantially parallel with said axes, a first valving surface adjacent one of the ends of said lever and a second valving surface adjacent the other end of said lever, said first and second valving surfaces being transverse to and respectively aligned with said inlet port and said nozzle and being movable in and out of engagement therewith to selectively control the flow therethrough, means for biasing said lever into engagement with said inlet port to normally prevent flow therethrough, condition sensing means connected to said rotatable shaft, said nozzle being connected to said rotatable shaft for rotation therewith in response to signals from said condition sensing means and being in engagement with said second valving surface for driving said first valving surface out of engagement with said inlet port upon receipt of a predetermined signal from said condition sensing means, said nozzle being rotated out of engagement with said second valving surface upon receipt of a predetermined signal from said condition sensing means when said lever is in engagement with said inlet port, and a first pressure responsive means connected to said lever for imposing a moment thereon substantially equal and opposite to that imposed on said lever by the pressure within said chamber.

9. A relay device according to claim 7 in which said means for biasing is a coil spring.

10. A relay device according to claim 9 in which said pressure responsive means is a bellows having one end movable in response to the pressure within said chamber in which said end is attached to said lever.

11. A relay device for generating a pressure proportional to a sensed condition comprising a substantially enclosed chamber having an inlet port adapted to be connected to a source of pressure and an outlet port adapted to be connected to means for controlling said sensed condition, a rotatable shaft mounted in said chamber and having a bore therein extending from said chamber to a point external thereof open to atmosphere, an exhaust conduit comprising a nozzle mounted within said chamber and communicating with said bore for exhausting to atmosphere, said nozzle and said inlet port having substantially parallel axes and facing in substantially opposite directions, a lever rotatably mounted intermediate its ends on said rotatable shaft being rotatable thereon in a plane substantially parallel with said axes, a first valving surface adjacent one of the ends of said lever and a second valving surface adjacent the other end of said lever, said first and second valving surfaces being transverse to and respectively aligned with said inlet port and said nozzle and being movable in and out of engagement with said inlet port and said nozzle by the rotation of said lever to selectively control the flow therethrough, means for biasing said lever into engagement with said inlet port and the end of said nozzle to prevent flow therethrough, said means for biasing imposing a moment on said lever substantially equal opposite to that exerted by the pressure in said nozzle when the pressure within said chamber is zero, said nozzle being drivingly connected to said rotatable shaft for rotation therewith and engaging said second valving surface for rotating said lever in and out of engagement with said inlet port, said nozzle being movable out of engagement with said second valving surface when said first valving surface is in engagement with said inlet port, condition sensing means connected to said rotatable shaft for rotating said nozzle and in turn said lever with respect to said inlet port and for rotating said nozzle with respect to said lever, a first pressure responsive means connected to said lever for imposing a moment substantially equal and opposite to that imposed on said lever by the pressure within said chamber, and a second pressure responsive means communicating with said chamber for sensing the pressure therein and being connected to said rotatable shaft to drive the same in accordance with the pressure in said chamber in a direction opposite to that by said condition sensing means.

12. A relay valve for generating a pressure signal proportional to a sensed condition comprising a substantially enclosed chamber having first port means adapted to be connected to the source of pressure and a second port means for exhausting to atmosphere, a rotatable shaft having a lever mounted thereon, said lever having valving surface means thereon rotatable in and out of engagement with both of said port means, means for biasing said lever so that said valving surface means normally engages both of said port means, at least one of said port means being mounted on said rotatable shaft to be rotatably driven thereby, said one port means when in engagement with said valving surface means and when rotated in a first direction rotating said valving surface means out of engagement with the other of said port means to permit flow therethrough, said one port means when rotated in a direction opposite to said first direction being rotated out of engagement with said valving surface means when the latter is in engagement with said other port means, and condition sensing means connected to said rotatable shaft for rotatably driving the same and in turn said one port means.

13. A relay device for generating a pressure signal proportional to a sensed condition comprising a substantially enclosed chamber having first port means adapted to be connected to a source of pressure and a second port means for exhausting to atmosphere, a rotatable shaft having a lever mounted thereon, said lever having valving surface means thereon rotatable in and out of engagement with both of said port means, means for biasing said lever so that said valving surface means normally engages both of said port means, at least one of said port means being mounted on said rotatable shaft to be rotatably driven thereby, said one port means when in engagement with said valving surface means and when rotated in a first direction rotating said valving surface means out of engagement with the other of said port means to permit the flow therethrough, said one port means when rotated in a direction opposite to said first direction being rotated out of engagement with said valving surface means when the latter is in engagement with said other port means, condition sensing means connected to said rotatable shaft for rotatably driving the same and in turn said one port means, and an outlet port adapted to be connected to means for controlling said sensitive condition.

14. A relay device for generating a pressure signal proportional to a sensed condition comprising a substantially enclosed chamber having first port means adapted to be connected to a source of pressure and a second port means for exhausting to atmosphere, a rotatable shaft having a lever mounted thereon, said lever having valving surface means thereon rotatable in and out of engagement with both of said port means, means for biasing said lever so that said valving surface means normally engages both of said port means, at least one of said port means being mounted on said rotatable shaft to be rotatably driven thereby, said one port means when in engagement with said valving surface means and when rotated in a first direction rotating said valving surface means out of engagement with the other of said port means to permit flow therethrough, said one port means when rotated in a direction opposite to said first direction being rotated out of engagement with said valving surface means when the latter is in engagement with said other port means, condition sensing means connected to said rotatable shaft for drivably rotating the same and in turn said one port means, an outlet port adapted to be connected to means for controlling said sensed condition, and a pressure responsive means communicating with said chamber for sensing the pressure therein and being connected to said rotatable shaft to drive the same in accordance with the pressure in said chamber in a direction opposite to that by said condition sensing means.

15. The invention according to claim 14 further including a second pressure responsive means connected to said lever for imposing a movement substantially equal and opposite to that imposed on said lever by the pressure within said chamber.

References Cited in the file of this patent
UNITED STATES PATENTS

| | | |
|---|---|---|
| 1,450,236 | Anderson | Apr. 3, 1923 |
| 2,179,450 | Gorrie | Nov. 7, 1939 |
| 2,334,679 | Mason | Nov. 16, 1943 |
| 2,725,068 | Howe | Nov. 29, 1955 |
| 2,800,914 | Side | July 30, 1957 |
| 2,804,877 | Rosenberger | Sept. 3, 1957 |